May 18, 1926.

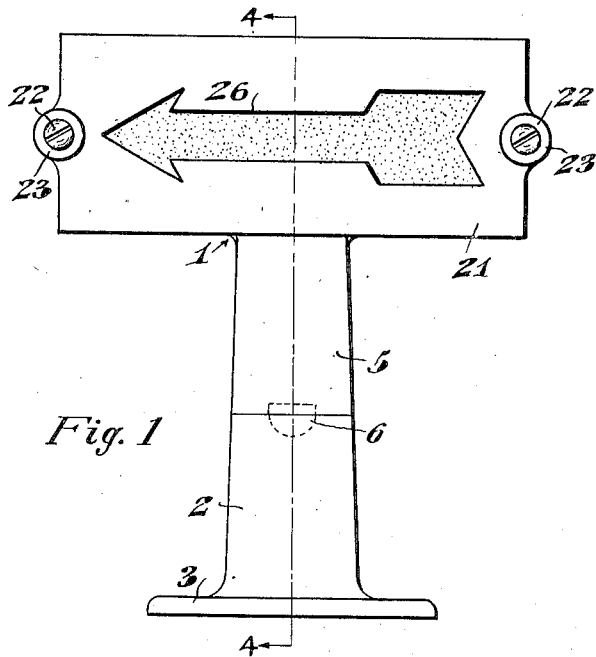
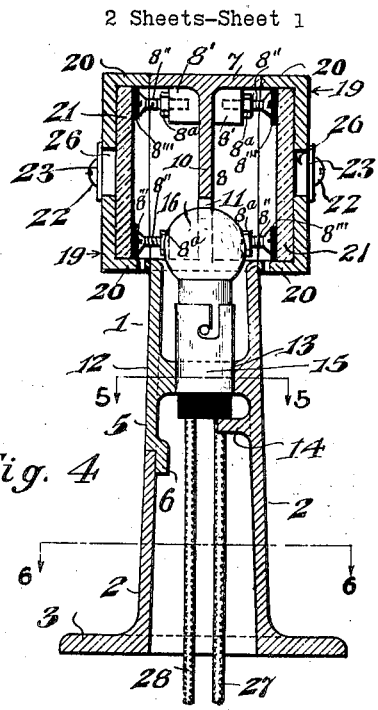
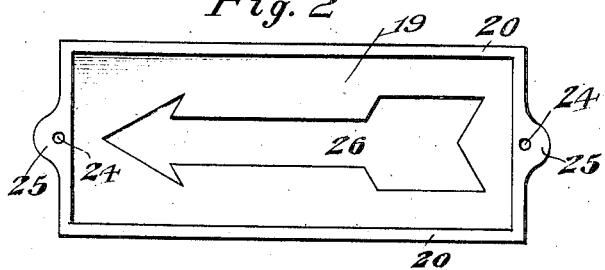
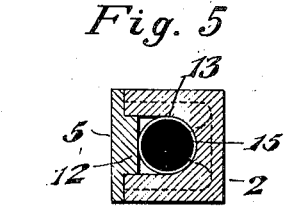
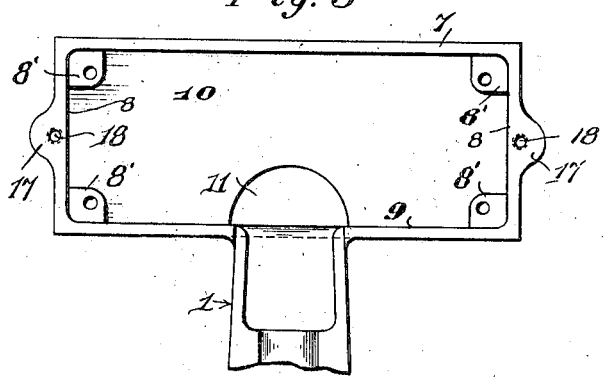
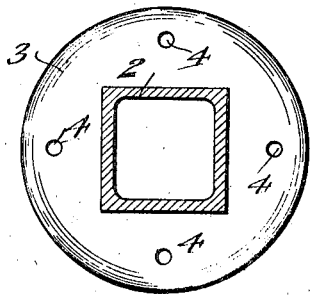

T. A. JENKINS 1,585,546

ELECTRIC TURN SIGNAL FOR AUTOMOBILES

Filed May 13, 1925  2 Sheets-Sheet 2

INVENTOR.
Thomas A. Jenkins,
BY
ATTORNEY.

Patented May 18, 1926.

1,585,546

UNITED STATES PATENT OFFICE.

THOMAS A. JENKINS, OF ROSELLE, NEW JERSEY.

ELECTRIC TURN SIGNAL FOR AUTOMOBILES.

Application filed May 13, 1925. Serial No. 30,118.

This invention relates to signaling devices and pertains particularly to an electrically operated signal designed to be mounted upon a vehicle body and operatable from the drivers seat of the vehicle, by the driver thereof.

The primary object of this invention, is the provision in a manner as hereinafter set forth, of an automobile signal of improved design and structure, strong, sturdy and durable, and adapted to give signals viewable simultaneously from the front or rear of the vehicle to indicate the proposed direction of movement which is to be made by the vehicle.

Another object of the invention is the provision, in a manner as hereinafter set forth, of a vehicle signal having improved means for securing into position and removing cover glasses upon the front and rear of the signal, and further having an improved means whereby an incandescent element contained within the body of the signal may be quickly inserted or removed from position.

A further and final object of the invention is the provision, in a manner as hereinafter set forth of an electric vehicle signal which shall be of extremely simple construction, making it easy to construct and assemble and place into position, and further easy to keep clean and in proper order after being placed in position.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:—

Figure 1 is a view in side elevation of the signal device embodying this invention.

Figure 2 is a view in side elevation of a cover plate for and removed from the device.

Figure 3 is a view in side elevation of the upper portion of the signal, the cover plate thereof being removed, to show the interior construction of the device.

Figure 4 is a vertical longitudinal section taken upon the line 4—4 of Figure 1.

Figure 5 is a transverse section taken upon the line 5—5 of Figure 4.

Figure 6 is a transverse section taken upon the line 6—6 of Figure 4.

Figure 7:
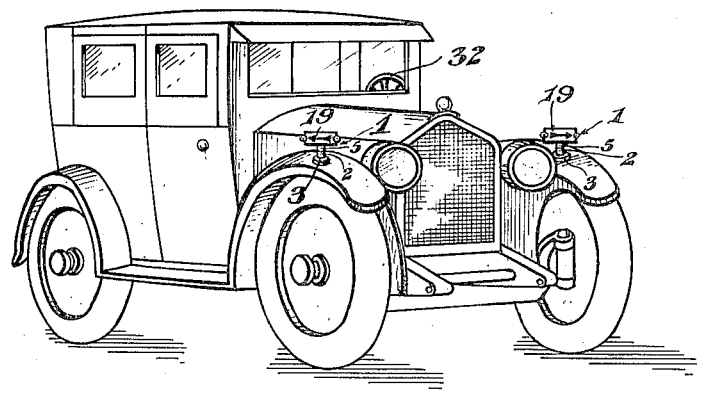
Figure 7 is a view in perspective of a motor vehicle showing a pair of the signal devices embodying this invention, applied to the fenders thereof.
Figure 8:
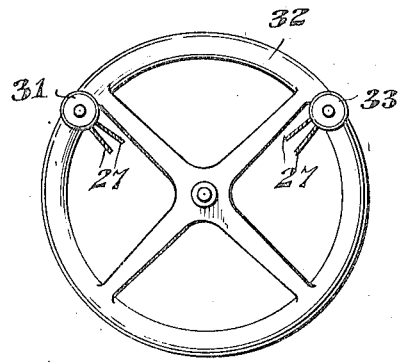
Figure 8 is a plan view of a vehicle steering wheel showing the manner in which the signal operating buttons are adapted to be affixed thereto and, Figure 9 is a lay out of the electrical circuits used in conjunction with a pair of the signals embodying this invention.
Figure 9:
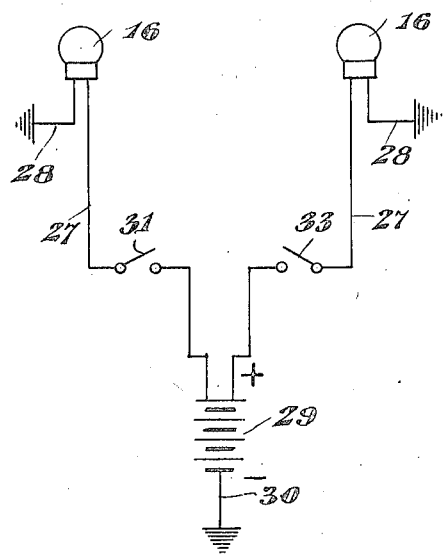

Referring now to the drawings in detail wherein like numerals of reference indicate corresponding parts throughout the several views, there is indicated generally by the numeral 1 the signal device embodying this invention, of which one, two or more may be applied to a vehicle at points best suited to the type and construction of the vehicle upon which the signals are used.

The signal device comprises a base 2 which as shown clearly in Figure 4 of the drawing, is a vertical column, hollow and tapering slightly from the bottom to the top thereof. Formed integral about the bottom part of the base 2 is a lateral surrounding foot flange 3 which is provided with any suitable number of apertures 4 to enable the foot of the base to be secured in position. As shown, the hollow base 2 is open top and bottom and the construction here shown is rectangular in cross sections as indicated in Figure 6, although applicant does not limit himself to a base having a cross section of this design but the same may be circular, hexagonal, triangular or any other cross sectional design desired.

The upper half of one side of the base is removable providing the door 5 and, the lower portion of this door has depending therefrom, from the inner face thereof, the lip 6 which lip when the door 5 is in position as shown in Figure 4, engages the inner side of the base 2 and serves to retain the lower portion of the door in position, with the outer side thereof flush with the outer side of the base.

Formed integral with and lying transversely of the top of the base 2 is a housing having a transverse top 7, the end walls 8 and the bottom 9. The sides of this housing are open as is shown, and there extends through the longitudinal center of the housing a partition 10 the lower central portion thereof being cutaway to provide the arched opening 11 which is positioned directly above the open upper end of the base 2. The purpose of this partition having the arched opening in the lower edge thereof will become apparent as the description of the signal proceeds.

At each corner of the partition 10 and upon each side thereof, there is formed an outwardly projecting lug or boss 8' having therein a threaded bore which opens toward the open side of the casing. In the bore of each of these lugs 8' is threaded a screw 8" having upon the head thereof a rubber cushion 8''', when the screws 8" are properly adjusted they may be locked in position by the lock nut 8ᵃ carried thereon.

There is provided for each open side of the housing a cover plate member which is indicated generally by the numeral 19 these plates being of the proper size to cover their respective sides of the horizontal housing, and each has a right angled flange 20 surrounding the edge thereof and bearing against the adjacent edge of the housing, and further providing a frame or recessed portion for the reception of a glass plate 21 which lies against the inner face of the plate 19 within the plate flange 20. A screw 22, passed through a washer 23, is inserted into each of the bores 18 after the plate 21 is in position holding the same in position against the side of the housing by passing through apertures 24 formed in lugs 25 upon the edges of the plate 19.

The glass plate 21, when the screws 8" are properly adjusted, bears against the cushioned head of the screws 8" and is prevented from rattling or becoming broken through jarring.

The inner face of the door 5 has formed thereupon above the lip 6 an inwardly extending lug 12, which as shown in Figure 5 does not extend at each end to the side edges of the door but terminates inwardly thereof, and this lug when the door is in position, is positioned between the ends of the legs of a substantially U-shaped flange 13 which is formed about the inside of the base 2 upon the same plane therewith, as is also shown in Figure 5. Beneath the flange 13 upon one wall of the base, is an inwardly extending finger 14 upon which a socket 15 is adapted to rest while being held in upright position by the lug 12 holding the same in the slot of the U-shaped flange 13. When a bulb as that indicated at 16 is positioned in the socket 15, it will extend beyond the upper portion of the base 2 into the housing to be accommodated in the arched opening formed in the partition.

As above stated the sides of the housing are open and the end walls 8 thereof each have at the central portion of each edge the offset 17 in which there is formed the threaded bore 18.

Each of the plates 19 has cut therethrough an opening in the form of an arrow 26, which the frosted plate 21 covers and thus when the light 16 is lighted within the housing the light rays will pass through the frosted glass 21 and through the arrow shaped opening 26.

It will be noted that one of the plates 19 when in position overlies the upper edge of the door 5 and thus maintains the door in locked or closed position, and the door can only be opened by removing the plate 19.

Extending from the lamp socket 15 is a pair of electrical conducting elements 27 and 28 respectively, the element 28 leading to a grounded contact with the vehicle frame and the conductor 27 leading to a battery 29 one side of which is grounded through the conductor 30 in the usual manner. An electrical switch 31 is interposed in the line 27 and, in the event that two signals are used upon a vehicle, this switch may be designated the left turn switch, and is fixed upon the left hand side of the vehicle steering wheel 32. If, as is stated, two signals are used then the other signal would also have a switch indicated by the numeral 33 and which may be termed the right turn switch, and this switch is preferably placed upon the right hand side of the steering wheel 32 in a position conveniently acceptable to the driver.

When a pair of the signals are used in connection with the vehicle, a desirable location for the same is upon the front fenders of the vehicle as indicated in Figure 7 of the drawing. When the signals are so placed, then the arrows of the signals are directed outwardly from the vehicle or in opposite directions one with respect to the other, and the driver while controlling the vehicle may conveniently press either the switch 31 for a left turn or the switch 32 for a right turn without removing either hand from the steering wheel. The steering of the vehicle is thus made doubly safe in that the proper signal is given by the driver and the driver is not obliged to remove either hand from the steering wheel while giving such signals.

Having thus described my invention what I claim is:—

1. A vehicle signal of the character described, comprising a hollow standard, a signal housing carried thereon, a lamp socket in said standard, a removable door in the side of said standard for access to said socket, a lip on the door at its lower end and engaging the standard to lock said lower end of the door, and removable indicia elements closing each side of said housing, one of said elements, when in position, serving to lock the upper end of said door in closed position.

2. A vehicle signal of the character described, comprising a hollow standard, a signal housing carried thereon, having open sides, a lamp socket in said standard, a removable door in the side of said standard for access to said socket, removable indicia elements closing each side of said housing, and means on the standard and said door to serve when the door is closed, to secure said socket in proper position within the standard.

3. A vehicle signal of the character set forth, comprising a hollow standard, a substantially U-shaped flange about the inner wall thereof, a supporting finger beneath said flange, a removable door in said standard, a lug on the inner face of said door connecting across the ends of said flange, a lamp socket supported on said finger and held in said flange by said door lug, and a signal housing upon the top of said standard adapted to be interiorly lighted by a lamp extending thereinto from said socket.

In testimony whereof, I affix my signature hereto.

THOMAS A. JENKINS.